F. B. KINNEY.
ICE SHAVER.
APPLICATION FILED APR. 28, 1917.
1,233,673.
Patented July 17, 1917.
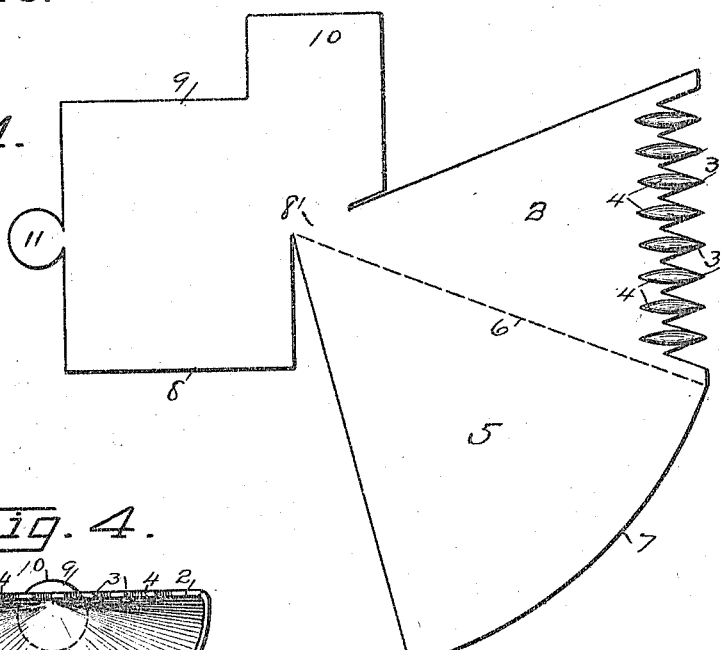
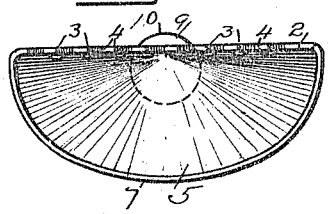
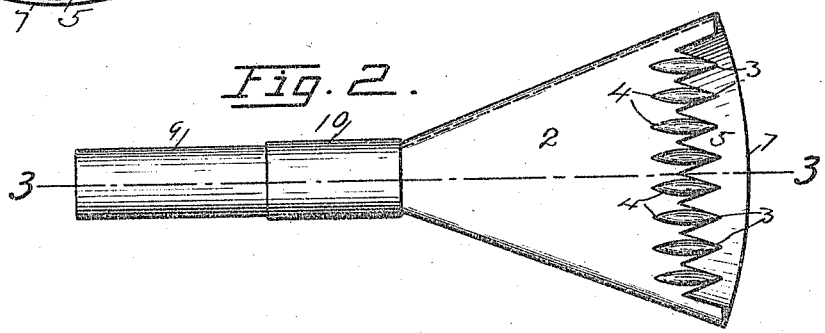
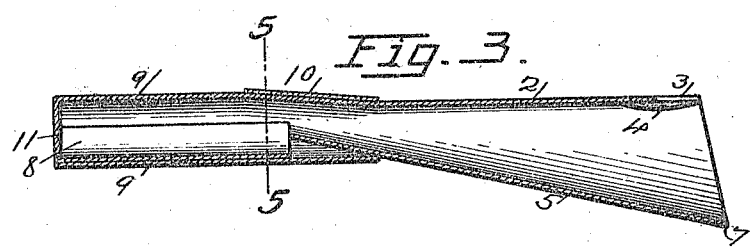
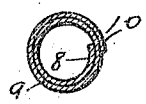
WITNESS.
A. C. Thomas
INVENTOR
Frank B. Kinney
BY
Harry D. Wallace
ATTORNEY

UNITED STATES PATENT OFFICE.

FRANK B. KINNEY, OF SYRACUSE, NEW YORK, ASSIGNOR OF ONE-HALF TO JOHN M. SMITH, OF SYRACUSE, NEW YORK.

ICE-SHAVER.

1,233,673.      Specification of Letters Patent.      Patented July 17, 1917.

Application filed April 28, 1917. Serial No. 165,067.

*To all whom it may concern:*

Be it known that I, FRANK B. KINNEY, a citizen of the United States, residing at Syracuse, in the county of Onondaga and State of New York, have invented certain new and useful Improvements in Ice-Shavers, of which the following is a specification.

This invention relates to improvements in ice shavers, and has for its object to provide a novel, simple and effective device of the class made out of a single piece of sheet steel or other suitable metal, which is first blanked-out and then folded and rolled upon itself to provide a neat, light, strong and serviceable tool for shaving ice. A further object is to provide an implement of the class, which in addition to the serrated cutting edge, is provided with a hood which arches over the cutting blade and prevents the small particles of ice from flying or scattering during the shaving operation. A further object is to provide a hooded ice shaver, which may be utilized as a scoop for gathering up the ice after the shaving is done. The said device is also handy for shoveling or scooping up salt which is usually mixed with the broken ice for making and preserving ice cream.

The various features and parts of the invention will be understood from the detailed description which follows, and by reference to the accompanying drawing, in which—

Figure 1 is a view of the sheet-metal blank from which the ice shaver is made.

Fig. 2 is the bottom plan view of the complete implement.

Fig. 3 is a central longitudinal section, taken on line 3—3 of Fig. 2.

Fig. 4 is an end view of the device, and

Fig. 5 is a cross-section taken on line 5—5 of Fig. 3.

In the drawing, the blank shown in Fig. 1 is composed of a single piece of sheet-metal, preferably steel, comprising a triangular portion 2, having at one of its free margins a series of integral teeth 3, which are used for shaving the ice, and each of said teeth is preferably treated by dies for concaving the same, as at 4, for the purpose of stiffening said parts.

Adjoining the portion 2 is a somewhat larger triangular portion 5, which is folded or bent along the dotted line 6, and then arched over the substantially flat portion 2 like a hood, as shown in Figs. 2, 3, and 4, and when so folded, the curved free margin 7 projects slightly beyond the serrated edge, as shown in Figs. 2 and 3. The hood 5 is spaced a sufficient distance from the cutting edge 3, to permit of the free use of the latter for shaving the ice, and said hood has for one of its objects to prevent the particles of ice from flying or scattering during the shaving operation.

After the hood portion 5 is disposed over the shaver blade 2—3, a handle portion 8 which connects by a narrow neck 8' to the blade 2, is rolled about one-half turn, and then the opposite side portion 9 is rolled toward and over the portion 8. The last rolling or curling operation consists of wrapping a flap or member 10 around the narrow neck portion of the hood and the adjacent portion of the handle for reinforcing that portion of the blank which is narrowest and weakest, as best seen in Figs. 2, 3 and 5. When these operations are completed, the shaving end or main body 2—5 of the device is in the form of a flat funnel, while the handle 8—9 is cylindrical. The open free end of the handle is closed by a circular integral flap 11. After the blank is folded and rolled up as described, the loose edges and joints may be soldered or brazed in the usual manner for holding the several portions in place.

My combined ice-shaver and scoop is extremely simple and can be produced at small expense, and when made out of steel of suitable gage will stand considerable wear and abuse and not get out of order.

Having thus described my invention, what I claim as new and desire to secure by Letters Patent, is—

1. An ice shaver, comprising one piece of sheet metal having a substantially flat triangular portion provided at one of its margins with a series of teeth, an integral portion folded and arched over said triangular portion, an integral cylindrical handle, and a reinforcing flap partially embracing the handle and said arched portion.

2. An ice shaver, comprising a substantially flat triangular portion, having at one of its margins a plurality of teeth, an integral hood arched above said flat portion, a cylindrical handle, and a reinforcing member surrounding the adjacent portions of said handle and said hood.

3. An ice shaver, comprising a substantially flat portion having at its free end a plurality of concave teeth, an integral hood covering one side of said flat portion and extending beyond said teeth, a handle joined to the opposite end of said flat portion, and a flap encircling and reinforcing said parts.

In testimony whereof I affix my signature.

FRANK B. KINNEY.

Copies of this patent may be obtained for five cents each, by addressing the "Commissioner of Patents, Washington, D. C."